United States Patent [19]

Masuda et al.

[11] Patent Number: 4,630,840
[45] Date of Patent: Dec. 23, 1986

[54] VEHICLE HEIGHT ADJUSTING DEVICE

[75] Inventors: Mitsuhiro Masuda; Osamu Igarashi; Keiichi Tokuyama, all of Katsuta, Japan

[73] Assignee: Hitachi, Ltd., Tokyo, Japan

[21] Appl. No.: 804,937

[22] Filed: Dec. 5, 1985

[30] Foreign Application Priority Data

Dec. 7, 1984 [JP] Japan .................................. 59-257613
Feb. 1, 1985 [JP] Japan .................................. 60-16561

[51] Int. Cl.$^4$ ............................................. B60G 11/26
[52] U.S. Cl. ..................................... 280/707; 180/41; 280/6 R; 280/DIG. 1; 340/52 R
[58] Field of Search ................ 280/6 H, 707, DIG. 1; 180/41; 340/52 R

[56] References Cited

U.S. PATENT DOCUMENTS 4,349,077  9/1982  Sekiguchi et al. .................. 280/707
4,377,293  3/1983  Senoo .................................. 280/6 R
4,401,310  8/1983  Ishikawa et al. .................... 280/707

FOREIGN PATENT DOCUMENTS 99809  8/1981  Japan .

Primary Examiner—John J. Love
Assistant Examiner—Kenneth R. Rice
Attorney, Agent, or Firm—Antonelli, Terry & Wands

[57] ABSTRACT

A vehicle height adjusting device comprises a vehicle height sensor for sensing the height of a vehicle, means for controlling the vehicle height which produces a vehicle height adjusting signal in response to the signal from the vehicle height sensor, driving means for adjusting the vehicle height in response to the vehicle height adjusting signal, constant voltage conversion means for converting a power supply voltage into a constant voltage and supplying the constant voltage to the means for controlling the vehicle height, and power supply control means for on-off controlling the supply of the power supply voltage in accordance with the turn-on and turn-off of an ignition switch. The vehicle height adjusting device further comprises means for stopping the power supply by a power supply stopping signal from the vehicle height control means when a predetermined time elapses after the ignition switch is turned off, and low voltage detecting means for stopping the operation of the means for controlling the vehicle height when the power supply is stopped and the output voltage from the constant voltage conversion means becomes lower than a predetermined reference voltage An integrating circuit can be used in place of the low voltage detecting means. The vehicle height adjusting device performs an assured self-cut-off operation.

3 Claims, 7 Drawing Figures

VEHICLE HEIGHT ADJUSTING DEVICE

BACKGROUND OF THE INVENTION

This invention relates to a vehicle height adjusting device, and more particularly to a vehicle height adjusting device equipped with a digital controller.

Conventional vehicle height adjusting devices perform an adjusting operation only while their ignition switch is in the conducting state, but it is convenient to maintain the adjusting operation for a certain period after the ignition switch is turned off in view of the getting on and off, loading and unloading, etc. For this reason, the vehicle height adjusting device incorporating a delay circuit has been proposed in Japanese Patent Unexamined Publication No. 99809/1981, for example. Now, it should be noted that the function of automatically cutting off the power supply after the ignition switch is turned off is called a self-cut-off function.

On the other hand, the adjusting devices have often employed a logic IC, microcomputer, etc. to implement their high performance. In the case where the above self-cut-off function is employed to maintain the adjusting operation of the adjusting device incorporating a digital controller for a certain period after the ignition switch is turned off and thereafter cut off the power source, i.e. to cut off the power supply to the circuits used, the supplied voltage is reduced with a certain time constant so that it passes the voltage not assured by IC itself, i.e. an uncertain voltage region, thus providing the possibility of making the device run away or making its self-cut-off function impossible. The occurrence of such a difficulty in the vehicle height adjusting device provides serious problems for vehicles since it leads to the overheat and burnout of a compressor motor, or the discharge of a battery which is due to the fact that the difficulty occurs after the turn-off of the ignition switch. The above self-cut-off function differs from the self-cut-off function used in the other household electric devices in that the operation of a control device must be stopped by the timer itself to prevent the battery from being discharged by the power consumption by the control device.

SUMMARY OF THE INVENTION

In view of the foregoing disadvantages of the prior art, it is a primary object of this invention to provide a digital vehicle height adjusting device which can prevent its malfunction or its runaway resulting therefrom so as to assure the self-cut-off function.

To attain this object, in accordance with this invention, there is provided, in a vehicle height adjusting device having a digital controller constructed by a microcomputer or IC, low voltage detecting means for detecting an output voltage from a constant voltage circuit to stop the operation of the controller when the detected voltage reaches a minimum operating voltage assuring the normal operation of the microcomputer or IC.

In accordance with this invention, there can be provided an integrating circuit in place of the above low voltage detecting means.

The above and other objects and features of this invention will be apparent from the following description taken in conjunction with the accompanying drawings, in which like reference numerals refer to like elements in the several views.

DESCRIPTION OF THE PREFERRED EMBODIMENTS

Several embodiments of this invention will be explained below with reference to the drawings.

Figure 1:
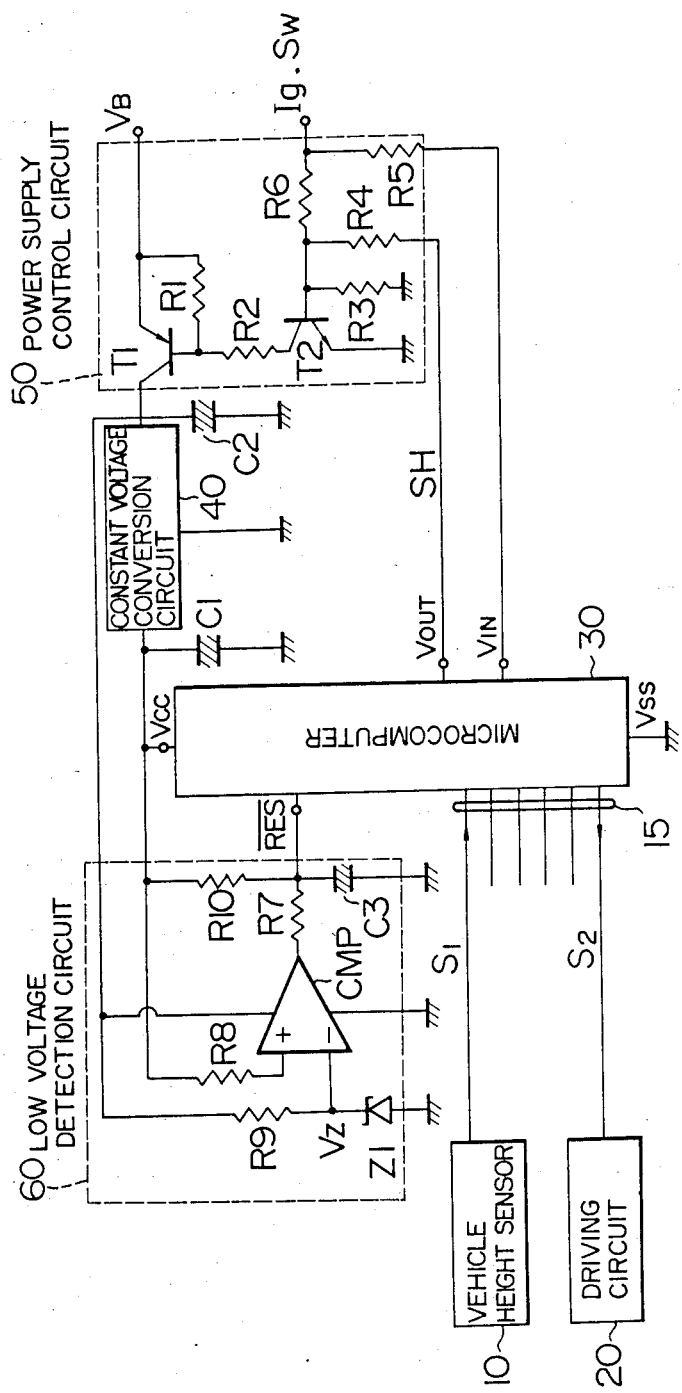
FIG. 1 is a block diagram showing a vehicle height adjusting device according to one embodiment of this invention.

FIG. 1 shows one embodiment of this invention. In this figure, a vehicle height sensor 10 senses a variable vehicle height and applies it to a microcomputer 30 through an input port 15 as a detected vehicle height signal $S_1$. Then, the microcomputer 30 performs a predetermined arithmetic operation of the signal $S_1$ and thereafter applies the result $S_2$ of the operation to a driving circuit 20 for adjusting the vehicle height through the output port 15.

On the other hand, the microcomputer 30 is supplied, at its $V_{CC}$ terminal, with a power supply voltage $V_B$ through a power supply control circuit 50, a constant voltage conversion device 40 and a low voltage detecting circuit 60. The power supply control circuit 50 is composed of two transistors $T_1$, $T_2$ and six resisters $R_1 \sim R_6$. More specifically, with respect to the PNP transistor $T_1$, its emitter is connected with the power supply voltage $V_B$, a resistor $R_1$ is inserted between its emitter and base, and its base is connected with the collector of the NPN transistor $T_2$; as for the NPN transistor $T_2$, its emitter is grounded and its base is grounded through the resistor $R_3$ and is connected with the output terminal of an ignition switch Ig.Sw which will be explained later; and the both terminals of the resistor $R_6$ are connected with the $V_{out}$ and $V_{in}$ terminals of the microcomputer 30 through the resistors $R_4$ and $R_5$, respectively.

The collector of the transistor $T_1$ serving as the output terminal of the power supply control circuit 50 is connected with the constant voltage conversion device 40, the input terminal of which is grounded through a capacitor $C_2$, and the output terminal of which is connected with the low voltage detecting circuit 60 described below and grounded through a capacitor $C_1$.

The low voltage detecting circuit 60 is constructed by a comparator CMP. The power supply terminal of the comparator CMP is connected with the output terminal from the power supply control circuit 50 which is divided by a series connection of a resistor $R_9$ and a Zenor diode $Z_1$ to be connected with the minus (−) terminal of the comparator CMP. The output terminal of the constant voltage conversion device 40 is connected with the plus (+) terminal of the comparator CMP through a resistor $R_8$. The output terminal of the comparator CMP is connected with the reset ($\overline{RES}$) terminal through a resistor $R_7$. The reset terminal is grounded through a capacitor $C_3$ and is connected with the $V_{CC}$ terminal of the microcomputer 30 through a resistor $R_{10}$.

The operation in this embodiment will be explained below. It should be noted that the microcomputer 30 performs, for the adjustment of the vehicle height, the input of the output from the vehicle height sensor 10, its arithmetic operation and the output of the operation result to the driving circuit 20 by means of the input/output port 15.

First, when the ignition switch Ig.Sw is turned on, the transistor $T_2$ is turned on through the resistor $R_6$ and the transistor $T_1$ is also turned on through the resistor $R_2$. Then, the power supply voltage $V_B$ starts to supply a constant voltage to the $V_{CC}$ terminal through the transistor $T_1$ and the constant voltage conversion device 40. It should be noted that the capacitors $C_1$ and $C_2$ are provided for smoothing and prevention of oscillation. The microcomputer 30 is reset through the resistor $R_{10}$ and the capacitor $C_3$ and starts the operation thereof. On the other hand, the signal indicative of the ignition switch Ig.Sw being in its "on" state is applied to the microcomputer 30 at its $V_{in}$ terminal through the resistor $R_5$, and in response to this, the microcomputer 30 produces a HIGH signal at its $V_{out}$ terminal. This HIGH signal turns on the transistor $T_2$ through the resistor $R_4$. Thus, the transistor $T_2$ is turned on by two signals of the ignition switch Ig.Sw and $V_{out}$. The vehicle height control is normally performed in this state.

Figure 2:
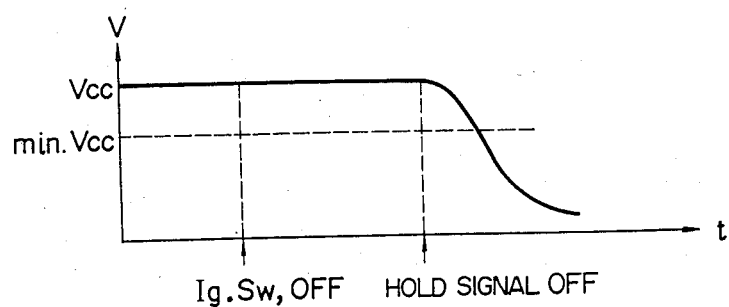
FIG. 2, is a view showing Vcc waveforms for explaining the operation of the vehicle height adjusting device as shown in FIG. 1.

Next, the ignition switch Ig.Sw is turned off, the transistor $T_2$ is not turned on through the resistor $R_6$ but turned on only through the resistor $R_4$ from the signal of $V_{out}$. On the other hand, the signal indicative of the ignition switch being its off state places $V_{in}$ on the LOW level. Then, a self-cut-off timer in the microcomputer 30 starts to operate and places $V_{out}$ on the LOW level after a predetermined time elapsed. Thus, the transistors $T_2$ and $T_1$ are turned off so that the supply of the constant voltage to the $V_{CC}$ terminal is stopped. The voltage at the $V_{CC}$ terminal, however, is reduced not abruptly but with a time constant as shown in FIG. 2 since the capacitors $C_2$ and $C_1$ are in their charged state. If any means is not provided, the self-cut-off operation will be incomplete because of the runaway of the microcomputer 30, the port erroneous setting thereby, etc. in the region of the uncertain supplied voltage. To obviate this inconvenience, the voltage at the $V_{CC}$ terminal is always monitored by the comparator CMP through the resistor $R_8$, and when it becomes lower than the breakdown voltage $V_Z$ of the Zener diode $Z_1$, the RES terminal voltage of the microcomputer 30 is reduced to the LOW level through the resistor $R_7$. It should be noted that $V_Z$ is set at a value which is equal to the minimum operation assuring voltage of the microcomputer 30. Thus, the microcomputer 30 is surely turned off after the transistors $T_2$ and $T_1$ are turned off.

In accordance with this embodiment, the low voltage detecting circuit 60 can be used as a low voltage resetting circuit as it is, and serves as a protection against the reduction of the power supply voltage.

Figure 3:
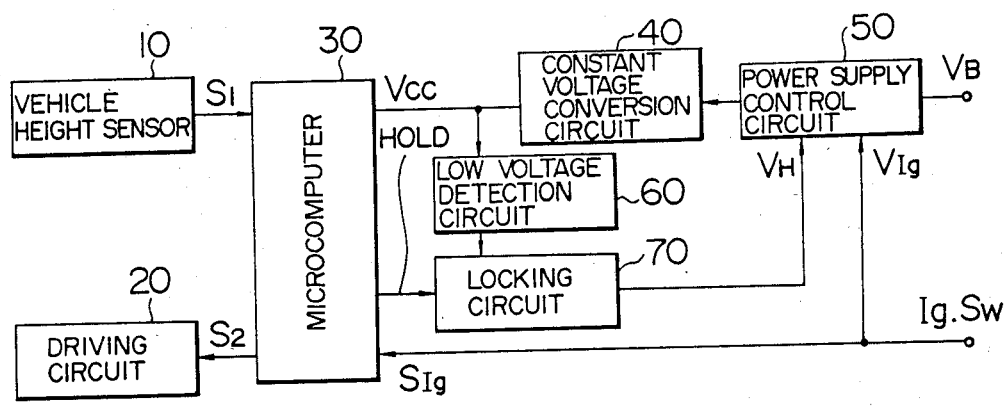
FIG. 3 is a brock diagram of a device according to another embodiment of this invention.

Another embodiment of this invention will be explained with reference to FIG. 3. The feature of this invention resides in that a locking circuit 70 is further provided, and the output terminal of the comparator CMP in the low voltage detecting circuit 60 is connected with this inhibition circuit 70. This locking circuit 70 is also connected with the base of the transistor $T_2$ in the power supply control circuit 50 through the resistor $R_4$.

The operation in this embodiment is almost the same as that in the embodiment shown in FIG. 1. This embodiment is advantageous in the case where the means 30 used as a vehicle height control device is a digital system so that it is not equipped with a reset terminal. That is, when the voltage at the $V_{CC}$ terminal becomes lower than the minimum assuring operation voltage, the means 30 cannot be reset so that it does not completely stop its operation. For this reason, as in this embodiment, the output terminal of the comparator CMP is connected with the locking circuit 70 provided between the output terminal $V_{out}$ and the power supply control circuit 50 so that the output from the comparator CMP is applied to the locking circuit 70. This locking circuit 70 serves to prevent an abnormal HOLD signal at the output terminal $V_{out}$ from being delivered to the power supply control circuit 50 by means of the output from the comparator CMP when the voltage at the $V_{CC}$ terminal becomes lower than the Zener breakdown voltage $V_Z$. Thus, even if the means 30, i.e., vehicle height control device performs an erroneous operation in the region of the uncertain supplied voltage, lower than the minimum operation assuring voltage, the vehicle control device can completely stop its operation since the signal at the output terminal $V_{out}$ is not delivered to the power supply control circuit 50.

Figure 4:
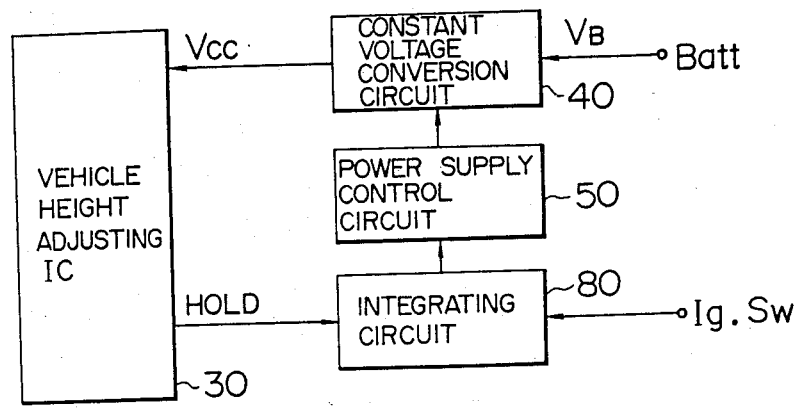
FIG. 4 is a brock diagram of a device according to still another embodiment of this invention.
Figure 6A:
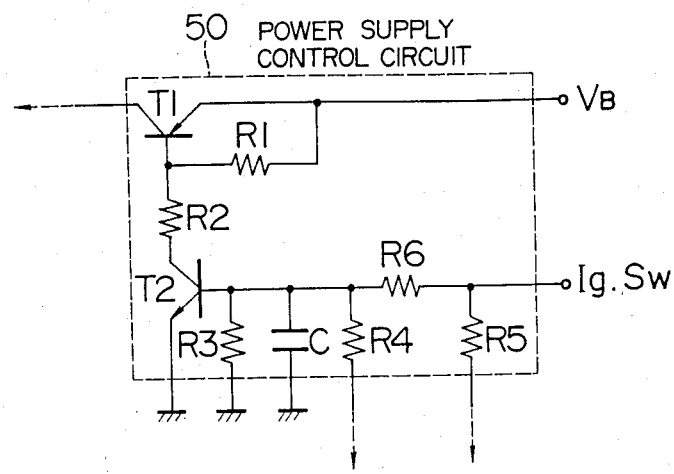
FIGS. 6A and 6B are circuit diagrams each showing an actual circuit arrangement of the embodiment shown in FIG. 4.
Figure 6B:
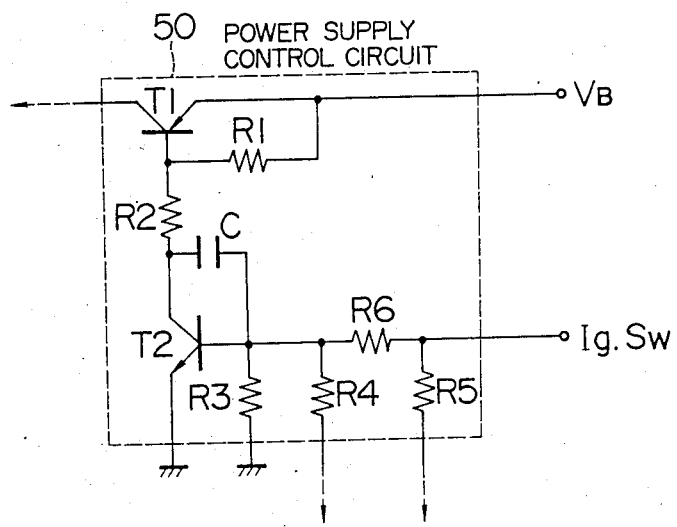

The object of this invention can be also attained by still another embodiment the basic arrangement of which is shown in FIG. 4. In this embodiment, the power supply control circuit 50 serving as a constant voltage circuit and an integrating circuit 80 are combined so that the power supply control circuit can have a delay function. Namely, as shown in FIG. 4, the integrating circuit 80 is provided between the power supply control circuit 50 and the vehicle height control device 30 constructed by an IC. More specifically, as shown in FIG. 6A, a capacitor C is arranged between the base and emitter of the transistor $T_2$ of the power supply control circuit 50, or as shown in FIG. 6B, a capacitor C is arranged between the base and collector of $T_2$ of the power supply control circuit 50.

Figure 5:
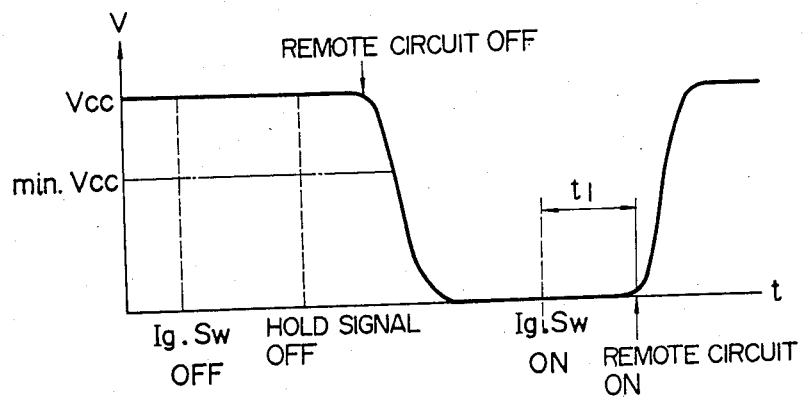
FIG. 5 is a waveform chart for explaining the operation of the embodiment shown in FIG. 4.

The operation of this embodiment will be explained with reference to FIG. 5 which shows the delay function in the waveform of $V_{CC}$. First, when a predetermined time elapses after the ignition switch is turned off, a self-cut-off operation is completed and the HOLD signal disappears. The constant voltage circuit 50, i.e. power supply control circuit, however, is turned off with a certain time delay by means of integrating circuit 80, which gives rise to the delayed waveform of $V_{CC}$ as shown in FIG. 5. Also when the ignition switch Ig.Sw is turned off, the delayed waveform of $V_{CC}$ results because of the provision of the integrating circuit 80.

In accordance with this invention, even when after the completion of the self-cut-off, the constant voltage circuit is turned off and $V_{CC}$ is decreased so that the vehicle height control device 30 performs an erroneous operation and thus the HOLD signal appears, the constant voltage circuit or remote circuit is turned on only after a certain time $t_1$. Thus, $V_{CC}$ can be further decreased to zero during the certain time $t_1$, as a result, the device is in down state. Accordingly, the integration of the input signal for a self-cut-off operation, i.e. HOLD signal assures the self-cut-off of the entire system.

As described above, in accordance with this invention, there is provided a vehicle height adjusting device equipped with a self-cut-off circuit surely performing a self-cut-off operation.

We claim:

1. A vehicle height adjusting device comprising:
   a vehicle height sensor for sensing the height of a vehicle;
   means for controlling the vehicle height which produces a vehicle height adjusting signal in response to the signal from the vehicle height sensor;
   driving means for adjusting the vehicle height in response to the vehicle height adjusting signal;
   constant voltage conversion means for converting a power supply voltage into a constant voltage and supplying the constant voltage to said vehicle height control means;
   power supply control means for on-off controlling the supply of the power supply voltage in accordance with the turn-on and turn-off of an ignition switch;
   means for stopping the power supply by a power supply stopping signal from said vehicle height control means when a predetermined time elapses after the ignition switch is turned off; and
   low voltage detecting means for stopping the operation of said vehicle height control means when the power supply is stopped and the output voltage from said constant voltage conversion means becomes lower than a predetermined reference voltage.

2. A vehicle height adjusting device according to claim 1, further comprising means for locking the output from said vehicle height controlling means when said low voltage detecting means stops the operation of said vehicle height control means.

3. A vehicle height adjusting device comprising:
   a vehicle height sensor for sensing the height of a vehicle;
   means for controlling the vehicle height which produces a vehicle height adjusting signal in response to the signal from the vehicle height sensor;
   driving means for adjusting the vehicle height in response to the vehicle height adjusting signal;
   constant voltage conversion means for converting a power supply voltage into a constant voltage and supplying the constant voltage to said vehicle height control means; and
   power supply control means for on-off controlling the supply of the power supply voltage in accordance with the turn-on and turn-off of an ignition switch;
   wherein said device further comprises
   means for stopping the power supply by a power supply stopping signal from said vehicle height control means when a predetermined time elapses after the ignition switch is turned off; and
   an integrating circuit for providing said power supply control means with a delay function, through which said power supply stopping signal is applied to said power supply control means.

* * * * *